United States Patent [19]

Kogelnik et al.

[11] 3,760,292

[45] Sept. 18, 1973

[54] INTEGRATED FEEDBACK LASER

[75] Inventors: Herwig Werner Kogelnik, Fair Haven; Charles Vernon Shank, Laurence, both of N.J.

[73] Assignee: Bell Telephone Laboratories, Incorporated, Murray Hill, N.J.

[22] Filed: Mar. 25, 1971

[21] Appl. No.: 128,165

Related U.S. Application Data

[63] Continuation-in-part of Ser. No. 100,659, Dec. 22, 1970, abandoned.

[52] U.S. Cl............ 331/94.5 C, 307/88.3, 330/4.3, 350/3.5
[51] Int. Cl............................................... H01s 3/00
[58] Field of Search.................... 331/94.5; 330/4.3; 307/88.3; 350/3.5, 96 WG

[56] References Cited
UNITED STATES PATENTS 3,448,405  6/1969  Wolff................................ 331/94.5
3,239,688  3/1966  Price.................................. 307/312
3,579,142  5/1971  Smiley............................. 331/94.5
3,611,190  10/1971  Keefe, Jr........................... 331/94.5
3,451,010  6/1969  Maiman........................... 331/94.5

OTHER PUBLICATIONS

Miller: "Integrated Optics: An Introduction", The Bell System Technical Journal, Vol. 48, pp. 2059–2069, Sept. 1969.

Primary Examiner—Edward S. Bauer
Attorney—W. L. Keefauver et al.

[57] ABSTRACT

Active materials having substantially time constant, spatially alternating variations in the propagation characteristics thereof produce laser oscillations when excited above a threshold of oscillation.

12 Claims, 8 Drawing Figures

Patented Sept. 18, 1973
3,760,292
3 Sheets-Sheet 1
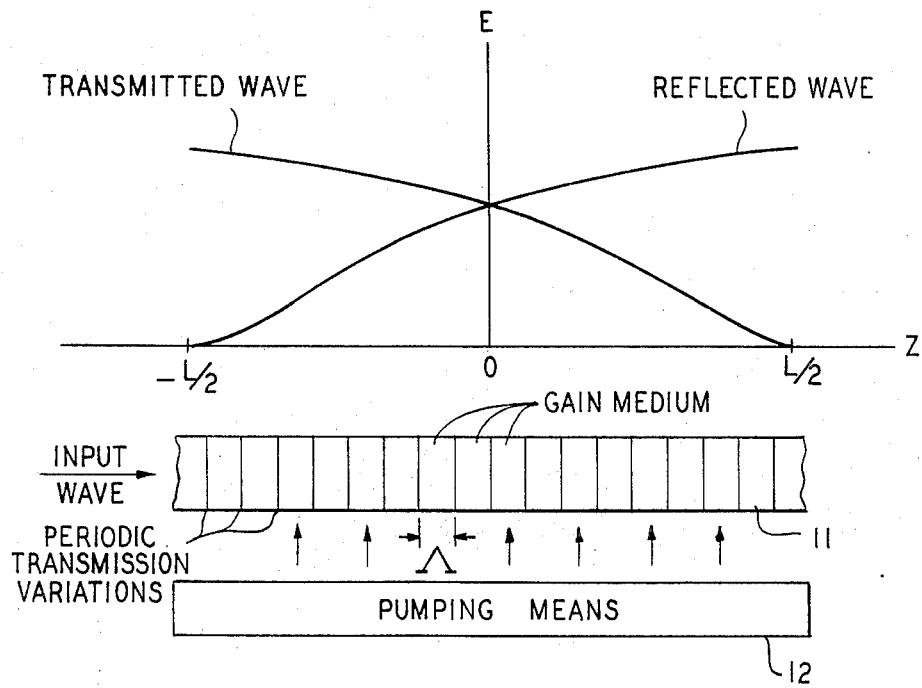
FIG. I
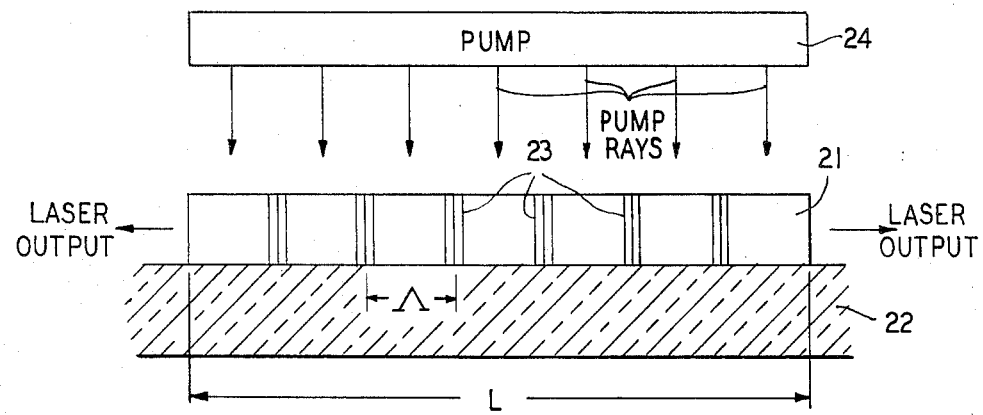
FIG. 2
INVENTORS H.W. KOGELNIK
C. V. SHANK
BY
David P. Kelley
ATTORNEY Patented Sept. 18, 1973

INTEGRATED FEEDBACK LASER

CROSS REFERENCE TO RELATED APPLICATION

This application is a continuation-in-part of U.S. patent application of H. W. Kogelnik and C. V. Shank, Ser. No. 100,659, filed Dec. 22, 1970, now abandoned.

BACKGROUND OF THE INVENTION

This invention relates to laser devices and, more particularly, to feedback arrangements for laser oscillators.

Laser oscillators, in general, consist of an active medium which produces gain and a resonator structure which provides feedback to produce the desired build-up of oscillations. The resonator structure may be any of a number of forms. The most common is, perhaps, a pair of mirrors, one at each end of the active medium, which reflect the optical energy back into the active medium. The mirrors may be planar or, as is more often the case, concave, in which case a focusing effect is realized. In virtually all cases the alignment of the mirrors and their spacing is to some extent critical. Furthermore, the mechanical problem of maintaining alignment and spacing under operating conditions gives rise to complex and expensive arrangements. It is also usually desirable that the mirrors present little loss to the impinging light beam. However, low loss mirrors, such as dielectric mirrors, are not only expensive, but generally are delicate and easily damaged.

In the case of solid state lasers, the resonator can be formed by silvering the ends of the solid active medium. However, these ends must be extremely flat and parallel or, in the case of curved mirrors, must be carefully ground to the proper radii and smoothness.

A further drawback to such resonator structures, as discussed in the foregoing, arises from the fact that the resonator is necessarily many wavelengths long. As a consequence, several oscillatory modes exist within the resonator, resulting in a broadening of the spectral band of the laser output.

In the prior art, some of the alignment problems can be obviated through the use of prisms, such as roof or corner prisms, to form the resonator reflecting surfaces. In some cases this also results in a fairly narrow spectral bandwidth. However, such prisms are quite difficult to manufacture to the desired degree of precision, and are, as a result, expensive.

SUMMARY OF THE INVENTION

The present invention overcomes the aforementioned problems through the elimination of the resonator cavity as such. The feedback mechanism, essential to oscillation, is distributed through and integrated with the active medium of the laser. In particular, the feedback structure is created by substantially time constant, spatially periodic perturbations in the transmission characteristics of the medium along the length thereof which may take the form of variations in the gain, index of refraction, propagation constant or other parameter of the medium. Such a distributed, integral feedback arrangement is inherently mechanically stable and in addition, because of the grating-like nature of the feedback structure, a filtering action occurs which drastically narrows the spectral bandwidth relative to conventional feedback arrangements.

In an illustrative embodiment of the invention, the laser active medium comprises a film of dichromated gelatin deposited on a glass substrate and impregnated with a dye having laser capability. An interference pattern exists in the gelatin layer, having been formed by holographic means, thereby creating within the medium a time constant spatial modulation of the refractive index of the active medium. When pumped by suitable means in excess of the oscillation threshold, the laser oscillates in an extremely narrow spectral band.

In other embodiments of the invention, substantially time constant, spatially periodic perturbatins in the transmission characteristics of the laser are produced by periodic gain variations, periodic loading of the medium, or periodic deformations, all in a variety of active media.

All of the illustrative embodiments of the invention have in common the principal feature of a substantially time constant, spatial periodicity in the transmission characteristics of the active medium.

The various features and principles of the invention will be more readily apparent from the following detailed description read in conjunction with the accompanying drawings.

DESCRIPTION OF THE DRAWINGS

FIG. 1 is a diagrammatic illustration of the principles of the present invention;

FIG. 2 is an illustrative embodiment of the invention in which refractive index is varied;

DETAILED DESCRIPTION

Figure 3:
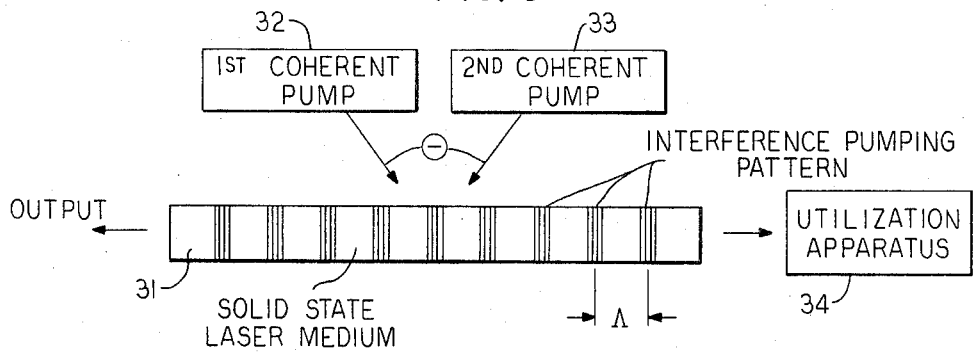
FIGS. 3, 4 and 5 are illustrative embodiments of the invention in which the gain mechanism is varied.

In FIG. 1 there is shown diagrammatically a distributed feedback laser structure 11 and a suitable pumping means 12. The structure 11 has a periodic spatial variation of period $\Lambda$, which may take one of a number of forms, such as a variation in the index of refraction $n$ of the medium or a variation in the gain constant $\alpha$. These variations can be expressed by $$n(z) = n + n_1 \cos Kz \qquad 1$$

and $$\alpha(z) = \alpha + \alpha_1 \cos Kz \qquad 2$$

where $z$ is measured along the optic axis, $K = 2\pi/\Lambda$, and $n_1$ and $\alpha_1$ are the amplitudes of the spatial modulation of period $\Lambda$. Such a structure, when the active medium is excited above a threshold level by the pump source 12, oscillates in the vicinity of a wavelength $\lambda_0$ given by $$\lambda_0/2n = \Lambda \qquad 3$$

which is the condition for backward Bragg scattering.

For purposes of explanation of the principles of the invention, consider an input wave incident upon the structure 11, as shown in FIG. 1. The wave, in traveling from left to right in the drawing encounters each transmission variation in turn, and a portion of it is reflected back, giving rise to a wave traveling from right to left. This wave in turn undergoes periodic partial reflections which enhance the original wave. Thus there is a coupled wave phenomenon of the form $$E = R(z)e^{\frac{-jKz}{2}} + S(z)e^{\frac{jKz}{2}} \quad (4)$$

which defines two counter-running waves of complex amplitudes R and S. As shown in the graph of FIG. 1, these waves grow in the presence of gain and feed energy to each other. The boundary conditions for the wave amplitudes are given by $$R(-L/2) = S(L/2) = 0 \quad 5$$

where L is the length of the laser structure. In a laser oscillator, at the endpoints a wave starts at zero amplitude and grows to a maximum at the other end. Each pair of periodic variations can be viewed as forming a resonator of length $\Lambda$ in which the end surfaces are partially transmitting and partially reflecting. Thus the structure of FIG. 1 can be viewed as a plurality of partial resonators in tandem.

For large gain factors, that is, where $$G = \exp(2\alpha L) \gg 1 \quad 6$$

the start oscillation condition, i.e., threshold, is given by $$4\alpha^2/G = (\pi n_1/\lambda)^2 + (\alpha_1/4)^2 \quad 7$$

If only the refractive index is modulated, as given in equation (1), the threshold condition becomes $$n_1 = (\lambda_0/L)(1nG/\pi \sqrt{G}) \quad 8$$

and where only the gain is modulated, the threshold condition is given by $$\alpha_1/\alpha = 4/\sqrt{G} \quad 9$$

The spectral bandwidth of the laser output can be readily determined by linear analysis from the foregoing. Thus, for example, when the gain factor G exceeds the threshold value at center frequency by a factor of 2, the threshold is exceeded over a spectral bandwidth $\Delta\lambda$ as given by $$\Delta\lambda/\lambda_0 = (\lambda_0/4\pi nL) 1nG \quad 10$$

In actuality, non-linear effects tend to narrow the bandwidth further. As an example, assume a device of length $L = 10$ mm, $G = 100$, and $\lambda_0 = 0.63\mu$m (center frequency). From equation (8) it can be seen that oscillation occurs if $n_1 \geq 10^{-5}$ and from equation (10) it can be seen that the bandwidth is $\Delta\lambda \approx 0.1$A. Such a bandwidth is at least an order of magnitude less than that of a conventional dye laser.

FIG. 2 depicts an illustrative embodiment of the invention wherein the laser member comprises a dichromated gelatin film 21 deposited on, for example, a glass substrate 22. Formed within the film 21 are a plurality of interference planes 23 of index of refraction change, spaced a distance $\Lambda$ apart. The planes 23 may be produced in the gelatin by interference between two coherent ultraviolet beams from, for example, a He-Cd laser, after which the gelatin is developed. This is a holographic technique well known to workers in the art, and produces time constant spatially periodic index of refraction changes in the gelatin. The gelatin is impregnated with an active laser medium such as a laser dye, e.g., Rhodamine 6G. Suitable pumping means, such as, for example, the ultraviolet radiation from a nitrogen laser, serves to activate the laser. In such a laser of a length of 10mm and a width of 0.1 mm, with a frine spacing $\Lambda$ of $0.3\mu$m, pumping densities in excess of $10^6$ W/cm² produce laser oscillations in the structure at approximately $0.63\mu$m with a spatial bandwidth of less than 0.5A. A similar laser, without the periodic variations of refractive index of the embodiment of FIG. 2 produces oscillations centered at approximately $0.59\mu$m and having a bandwidth of approximately 50A. Thus it can be seen that the present invention, as embodied in the device of FIG. 2, produces line narrowing by a factor of 100.

In FIG. 3 there is shown still another embodiment of the present invention wherein a solid state laser medium 31 such as, for example, neodymium —YAG, has induced therein a substantially time constant, spatially periodic interference pattern produced by the interference between angularly directed pumping lights from first and second coherent pump sources 32 and 33, thereby producing periodic gain variation. The two pump sources shown are intended to be symbolic or numerous arrangements. An expeditious way of achieving the desired frequency and phase relationship of the two beams is through the use of a single pump whose output is split into two beams with a mirror arrangement for directing the beams into the median at the desired angles. Proper choice of pump wavelength and angular direction of the beams produces the desired spacing $\Lambda$. The output of the laser may be utilized in any suitable manner such as, for example, utilization apparatus 34. The arrangement of FIG. 3 has the added virtue of tunability since variations in the angle $\theta$ produce changes in $\Lambda$, thereby changing the laser wavelength.

From equation (3) it can be seen that the wavelength of oscillation $\lambda_0$ is a function of the index of refraction $n$ of the medium. Thus, in, for example, the arrangement of FIG. 3, for a fixed $\Lambda$, tuning may also be achieved by varying $n$, where the nature of the medium permits. For example, in a dye laser where the dye is Rhodamine 6G and the solvent is a mixture of methanol and benzyl alcohol, the index of refraction can easily be varied from 1.33 to 1.55 by varying the proportions of the solvent constituents. In an arrangement such as FIG. 3, for a fixed angle $\theta$ of approximately 107.6°, a change of 0.01 in $n$ changes $\lambda_0$ by approximately 43A. for a dye concentration of $1 \times 10^{-3}$M.

Figure 4:
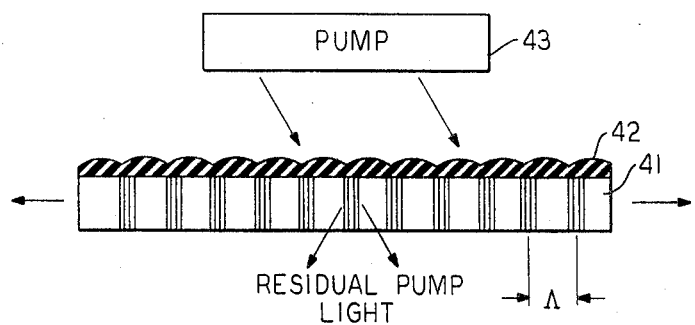

Periodic pump variations similar to those of FIG. 3 can also be realized by the arrangement of FIG. 4 wherein the laser medium 41, which may be any of a number of types, has deposited thereon or in proximity thereto an optical grating 42 which produces within the medium periodic intensity variations in the pumping energy from the pump source 43.

Figure 5:
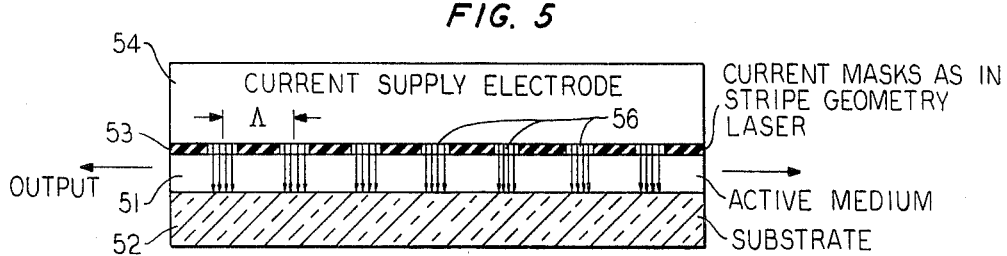

In a semiconductor laser, the pump periodicities of FIGS. 3 and 4 can be achieved by the arrangement of FIG. 5. The embodiment of FIG. 5 comprises a semiconductor laser 51 of suitable material deposited or mounted on a substrate 52. On one surface of the member 51 is a current mask 53 which permits pumping or energizing current from a current supply electrode 54 to pass only through apertures 56 which are spaced a distance $\Lambda$ apart. The net effect is to produce a periodic gain variation within the semiconductor laser member 51.

Figure 6:
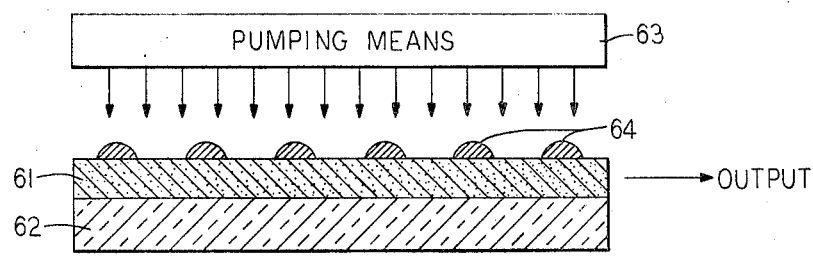

The foregoing embodiments of the invention depend upon index of refraction or gain variations to achieve the desired results. It is also possible to produce a laser oscillator in accordance with the principles of the invention through spatially periodic variations of the propagation constant $\beta$ of the active medium. Such an arrangement is shown in FIG. 6. The device of FIG. 6 comprises a thin film active medium 61 of, for example, neodymium doped high index glass, mounted or deposited upon a suitable substrate 62. A source of pumping energy 63 serves to excite the active medium 61. Disposed on the surface of the medium 61 are a plurality of dielectric elements 64 of glass, for example, which extend across the member 61 and are parallel to each other. Elements 64 are spaced a distance $\Lambda$ apart, and, through the mechanism of dielectric loading, producing variations in the propagations constant $\beta$ of the thin film member 61, spaced a distance $\Lambda$ apart.

Figure 7:
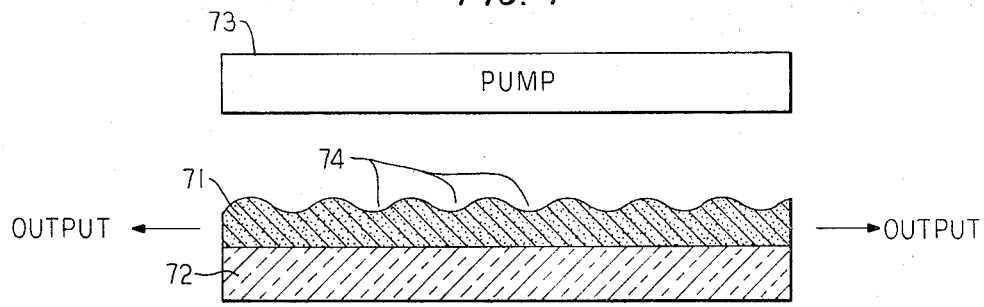
FIGS. 6 and 7 are illustrative embodiments of the invention in which the propagation constant is varied.

In FIG. 7 there is shown an arrangement similar to that of FIG. 6. A thin film member 71 of suitable active material is mounted or deposited upon a suitable substrate 72. A pumping means 73 supplies energy to the medium 71. In accordance with the principles of the invention, one surface of member 71 has a plurality of thickness variations 74 of periodicity $\Lambda$. These variations in turn produce variations in the propagation constant $\beta$ of the medium, of a periodicity $\Lambda$.

Figure 8:
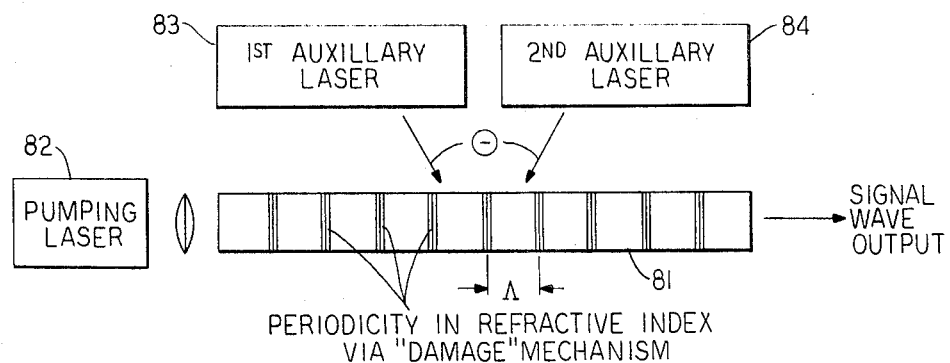
FIG. 8 illustrates the principles of the invention as applied to a parametric oscillator.

In FIG. 8 there is shown an arrangement in which the principles of the invention are utilized in a parametric oscillator. A member 81 of suitable material, such as, for example, lithium niobate, is end pumped by a pumping laser 82, such as, for example, a krypton ion laser, which emits light in the red region of the spectrum. In accordance with the principles of the present invention, there is formed within the member 81 a time constant, spatially periodic index of refraction change by means of the interference between two coherent beams from auxiliary lasers 83 and 84, directed into the medium 81 at an angle $\theta$ to each other. As is the case in the arrangement of FIG. 3, a pair of beam sources is intended to symbolize numerous arrangements. In actuality, a single source with a beam splitter and scissor arrangement is perhaps the most expeditious way of insuring the proper phase and frequency relationships between the two beams. The interference pattern is created in the medium through the well known "damage" mechanism which occurs in lithium niobate, for example, when subjected to coherent radiation.

For parametric oscillations, the period $\Lambda$ of the interference pattern may be such as to feed back the idler wave. Thus the auxiliary laser or lasers 83, 84 may be argon ion lasers, which produce light in the ultraviolet region of the spectrum. On the other hand $\Lambda$ may be chosen to feed back the signal frequency, or, in certain cases, it may be such that both signal and idler are fed back.

The various principles and features of the present invention have been illustrated in the foregoing as applied to numerous embodiments. Various other arrangements utilizing these principles and features may occur to workers in the art without departure from the spirit of the invention.

What is claimed is:

1. An optical frequency oscillator comprising an active medium and a feedback mechanism, said feedback mechanism comprising substantially time constant, spatially periodic perturbations in the transmission characteristics of the medium continuously along the length thereof and substantially transverse to the optical direction of propagation of energy in the medium, said perturbations being of sufficient magnitude and being spaced by an integral multiple of one-half wave lengths of the optical frequency oscillations to produce sufficient feedback of the optical energy to sustain oscillations, and means for exciting said active medium to produce oscillations.

2. An optical frequency oscillator as claimed in claim 1 wherein the periodicity of said perturbations is given by $$\lambda_o/2n = \Lambda$$

where $\Lambda$ is the period, $\lambda_o$ is the wavelength of oscillations and $n$ is the index of refraction of said medium.

3. An optical frequency oscillator as claimed in claim 2 wherein said perturbations are of the form $$n(z) = n + n_1 \cos Kz$$

where $z$ is distance measured along the optical axis of said oscillator, $n_1$ is the maximum amplitude of the index of refraction, and $K = 2\pi/\Lambda$.

4. An optical frequency oscillator as claimed in claim 2 wherein said perturbations are of the form $$\alpha(z) = \alpha + \alpha_1 \cos Kz$$

where $\alpha$ is the gain of the active medium, $z$ is distance measured along the optical axis of the oscillator, $\alpha_1$ is the maximum gain of the medium, and $K = 2\pi/\Lambda$.

5. An optical frequency oscillator comprising an active medium and a feedback mechanism, said feedback mechanism comprising means for producing substantially time constant, spatially periodic perturbations in the gain characteristics of the medium continuously along the length thereof and substantially transverse to the direction of propagation of optical energy in the medium, said perturbations being of sufficient magnitude and being spaced by an integral multiple of one-half wave lengths of the optical frequency oscillations to produce sufficient feedback of the optical energy to sustain oscillations, and pumping means for exciting said active medium to produce oscillations.

6. An optical frequency oscillator as claimed in claim 5 wherein said means for producing substantially time constant, spatially periodic perturbations comprises means for directing pumping energy into said medium at an angle to the direction of pumping energy of said pumping means.

7. An optical frequency oscillator as claimed in claim 5 wherein said means for producing substantially time constant, spatially periodic perturbations comprises means for causing the pump energy to enter said active medium at spaced intervals along the length thereof.

8. An optical frequency oscillator as claimed in claim 7 wherein said last mentioned means comprises a diffraction grating adjacent to and extending along the length of said active medium.

9. An optical frequency oscillator as claimed in claim 7 wherein said last mentioned means comprises an apertured mask extending along the length of said active medium.

10. An optical frequency oscillator comprising an active medium and a feedback mechanism, said feedback mechanism comprising means for producing substantially time constant, spatially periodic perturbations in the propagation constant of said medium continuously along the length thereof and substantially transverse to the direction of propagation of optical energy in the medium, said perturbations being of sufficient magnitude and being spaced by an integral multiple of one-half wave lengths of the optical frequency oscillations to produce sufficient feedback of the optical energy to sustain oscillations, and pumping means for exciting said active medium to produce oscillations.

11. An optical frequency oscillator as claimed in claim 10 wherein said means for producing substantially time constant, spatially periodic perturbations in the propagation constant comprises a plurality of dielectric members spaced along the length of said active medium for periodically dielectrically loading said medium.

12. An optical frequency oscillator as claimed in claim 10 wherein said active medium is of solid material and said means for producing substantially time constant, spatially periodic perturbations in the propagation constant comprises a plurality of spaced thickness variations along the length of said medium.

* * * * *